United States Patent
Yamane

[11] Patent Number: 5,888,647
[45] Date of Patent: Mar. 30, 1999

[54] RADIOGRAPHIC INTENSIFYING SCREEN

[75] Inventor: Katsutoshi Yamane, Kanagawa, Japan

[73] Assignee: Fuji Photo Film Co., Ltd, Kanagawa, Japan

[21] Appl. No.: 674,568

[22] Filed: Jul. 5, 1996

[30] Foreign Application Priority Data

Jul. 4, 1995 [JP] Japan ................................. 7-191237

[51] Int. Cl.$^6$ .............................. G01J 1/58; G01N 21/64; G21K 4/00
[52] U.S. Cl. ..................... 428/338; 428/690; 250/483.1
[58] Field of Search ........................... 250/483.1, 486.1, 250/487.1; 428/690, 480, 338

[56] References Cited

U.S. PATENT DOCUMENTS

| | | | |
|---|---|---|---|
| 3,895,157 | 7/1975 | Brixner et al. | 428/220 |
| 4,090,085 | 5/1978 | Shimiya et al. | 250/483.1 |
| 4,380,702 | 4/1983 | Takahashi et al. | 250/327.2 |
| 4,431,922 | 2/1984 | Patten | 250/486.1 |
| 4,501,796 | 2/1985 | Kitada | 428/337 |
| 4,618,778 | 10/1986 | Kitada | 250/483.1 |
| 4,711,827 | 12/1987 | Chriustini | 428/690 |
| 4,943,727 | 7/1990 | Kitada et al. | 250/483.1 |
| 5,126,573 | 6/1992 | Knuepfer et al. | 250/483.1 |
| 5,477,053 | 12/1995 | Umemoto et al. | 250/483.1 |

FOREIGN PATENT DOCUMENTS 999780  7/1965  United Kingdom.

OTHER PUBLICATIONS

J58–062,600 Patent Abstract.
JP 62–137,597 Patent Abstract

*Primary Examiner*—Daniel Zirker
*Attorney, Agent, or Firm*—Birch, Stewart, Kolasch, & Birch, LLP

[57] ABSTRACT

A radiographic itensifying screen has a support, a light-reflecting layer, a phosphor layer and a surface protective layer. The light-reflecting layer has a thickness of 15 to 100 $\mu$m and is made of 25 to 75 vol. % of $TiO_2$ particles having a mean particle size of 0.1 to 0.5 $\mu$m and a polymer birder. The phosphor layer has a thickness of 40 to 120 $\mu$m and contains particles of phosphor which gives a main luminance in a wavelength region of longer than 430 nm. This radiographic intensifying screen is preferably placed between an object to be exposed to radiation and a radiographic film.

12 Claims, 6 Drawing Sheets

RADIOGRAPHIC INTENSIFYING SCREEN

FIELD OF THE INVENTION

The present invention relates to a radiographic intensifying screen and a radiographic image-producing system using the intensifying screen as the front-side intensifying screen.

BACKGROUND OF THE INVENTION

A standard radiographic intensifying screen comprises, in order, a support, a light-reflecting layer, a phosphor layer and a surface-protective layer. The support may contain light-reflecting material so as to omit the light-reflecting layer.

The light-reflecting layer is arranged to enhance sensitivity of the radiographic intensifying screen. The higher the light reflectance is, the higher the sensitivity is. Therefore, a radiographic intensifying screen of high sensitivity type is prepared using a support which contains a white pigment to give a high light reflectance. In contrast, a radiographic intensifying screen of high sharpness type is prepared using a support which contains light-absorbing carbon black and has no light reflecting layer thereon. The light-reflecting support serves to return back spontaneous emission produced by phosphor particles on the bottom side (i.e., side in the vicinity of the support surface) to the upper surface. Therefore, the use of the light-reflecting support enhances the sensitivity of the intensifying screen, but gives an adverse effect to sharpness of the resulting radiographic image. In contrast, the carbon black-containing support essentially absorbs and does not reflect the spontaneous emission emitted by the phosphor on the bottom side, so that it serves to give a radiographic image with high sharpness but not to enhance the sensitivity. Most of the commercially available radiographic intensifying screens are designed in consideration of balance between the sensitivity and sharpness required for purposes of respective screens.

The replacement of the light-reflecting support with a $TiO_2$-containing light-reflecting layer on the support of the radiographic intensifying screen is also well known. Such light-reflecting support is described in the following patent publications: Japanese Patent Provisional Publication (unexamined) Nos. 48-81495, 51-120694, 59-225400, 61-212799, H2-293700, 63-313100, 63-191100, 62-137596, 62-137597, 56-12600, 62-133400, H2-12100, H2-85800, 59-8782, H2-59193, 59-162500, 58-62600, H3-255400, 60-140200, 52-28284, and 62-203098; Japanese Patent Publication (examined) No. H4-37399; U.S. Pat. No. 3,895,157; and British Patent No. 999,780. Details of the disclosures of these patent publications are described below.

Japanese Patent Provisional Publication Nos. 48-81495, 51-120694, 59-3300, 61-212799, 62-137596, 62-203098 and 60-140200, and Japanese Patent Publication No. H4-37399 contain working examples which show a radiographic intensifying screen having a light-reflecting undercoat layer which uses $TiO_2$ as the light-reflecting material. The phosphors employed in combination with the $TiO_2$-containing light-reflecting layer in these radiographic intensifying screen are those which give emissions in the blue light region.

Japanese Patent Provisional Publication No. 59-225400 describes a comparison example which shows a light-reflecting undercoat layer using $TiO_2$ of anatase structure (particle size: 0.1 to 0.25 $\mu$m). The phosphor employed in combination with this light-reflecting layer is $BaFBr:Eu^{2+}$ which gives an emission in the violet color region. The publication describes that this light-reflecting layer is not favorably employable.

Japanese Patent Provisional Publication Nos. H-293700, 63-313100, and 63-191100 describe radiographic intensifying screens of which support is a polyethylene terephthalate film containing $TiO_2$.

Japanese Patent Provisional Publication No. 62-137597 contains a working example of a radiographic intensifying screen in which $TiO_2$ particles are employed as light reflecting material for the light-reflecting undercoat layer. The reflectance is 88% in the visible light region. The phosphor employed in the intensifying screen is $CaWO_4$.

Japanese Patent Provisional Publication No. 56-12600 teaches that the provision of the $TiO_2$-containing light-reflecting layer is effective to increase the sensitivity of a radiographic intensifying screen. However, there is no teaching on how to balance the sensitivity and sharpness. Moreover, this publication is mainly directed not to a radiographic intensifying screen but to a radiation image conversion panel which uses a stimulable phosphor.

Japanese Patent Provisional Publication Nos. 62-133400, H2-12100, H2-85800, and 59-162500 describe light-reflecting layers using $TiO_2$. These light-reflecting layers are not for the radiographic intensifying screen but for the radiation image conversion panel which uses a stimulable phosphor.

Japanese Patent Provisional Publication Nos. 58-62600 and H3-255400 describe working examples in which an electroconductive metal oxide-coated layer is utilized. $TiO_2$ is mentioned as one of the examples of electroconductive metal oxides. The coated amount is so small as less as 1 $mg/cm^2$, and therefore no high reflection, thus no high sensitivity, is obtained.

Japanese Patent Provisional Publication No. 59-8782 gives a working example of a radiographic intensifying screen which shows the use of a $TiO_2$-containing support film and a comparison eagle which shows the provision of a $TiO_2$-containing undercoat layer. The $TiO_2$ contained in the undercoat layer of the examples is not enough in its amount and density, and satisfactory reflectance and sharpness is not accomplished.

Japanese Patent Provisional Publication No. 52-28284 describes a working example for a $TiO_2$-containing light-reflecting layer. The phosphor layer employed in combination appears to have a thickness of more than 180 $\mu$m (value calculated from the coated phosphor amount).

U.S. Pat. No. 3,895,159 and Japanese Patent Publication No. H2-59193 both contain a working example in which a $TiO_2$ containing light-reflecting layer is employed in a thick phosphor layer.

British Patent No. 999,780 describes a working example for a radiographic intensifying screen which utilizes a $TiO_2$-containing light reflecting layer. The phosphor employed in combination with the light reflecting layer is one which gives an emission in the blue color region. Moreover, the phosphor layer employed in the working example is rather thick.

Therefore, until now, there is not known a radiographic intensifying screen which shows both satisfactorily high sensitivity and satisfactorily high sharpness. Particularly, for a radiographic intensifying screen of high luminant type having a relative sensitivity (details are described hereinafter) of 250 or more which generally shows poor sharpness, enhancement of the sharpness is required.

SUMMARY OF THE INVENTION

The present invention has an object to provide a radiographic intensifying screen which shows both high sensitivity and high sharpness.

It is another object of the invention to provide a radiographic image producing system which enables to produce a radiographic image under high sensitivity and high sharpness.

The invention resides in a radiographic intensifying screen comprising a support, a light-reflecting layer, a phosphor layer and a surface protective layer in which the light-reflecting layer has a thickness of 15 to 100 μm and comprises 25 to 75 volume % of titanium dioxide particles having a mean particle size of 0.1 to 0.5 μm and a polymer binder, and the phosphor layer has a thickness of 40 to 120 μm and contains particles of phosphor giving a main luminance (emission) in a wavelength region of longer than 430 nm.

The titanium dioxide particles preferably are of rutile structure and preferably have a mean particle size in the range of 0.1 to 0.4 μm.

The phosphor preferably is a terbium activated phosphor having the formula of:

in which M is selected from the group consisting of yttrium, gadolinium and lutetium, and X is selected from the group consisting of sulfur, selenium and tellurium. A terbium activated gadolinium oxysulfide is most preferred.

The radiographic intensifying screen preferably shows a relationship between the thickness of the light-reflecting layer and the diffusive reflectance of the light-reflecting layer which is embraced within the shadow area of FIG. 1 of the attached draws.

The invention further resides in a combination of a radiographic intensifying screen and the above-identified radiographic intensifying screen, wherein the combination shows a CTF value of 0.40 or more at spatial frequency of 2 lines/mm when it is employed in combination with a double-sided radiographic film showing a cross-over of 14%.

The invention furthermore resides in a system for producing a radiographic image which comprises a couple of radiographic intensifying screens and a double-sided radiographic film intervening between the intensifying screens, wherein a radiographic intensifying screen arranged on the side near to an object to be exposed to radiation is the above-identified radiographic intensifying screen.

DETAILED DESCRIPTION OF THE INVENTION

Figure 1:
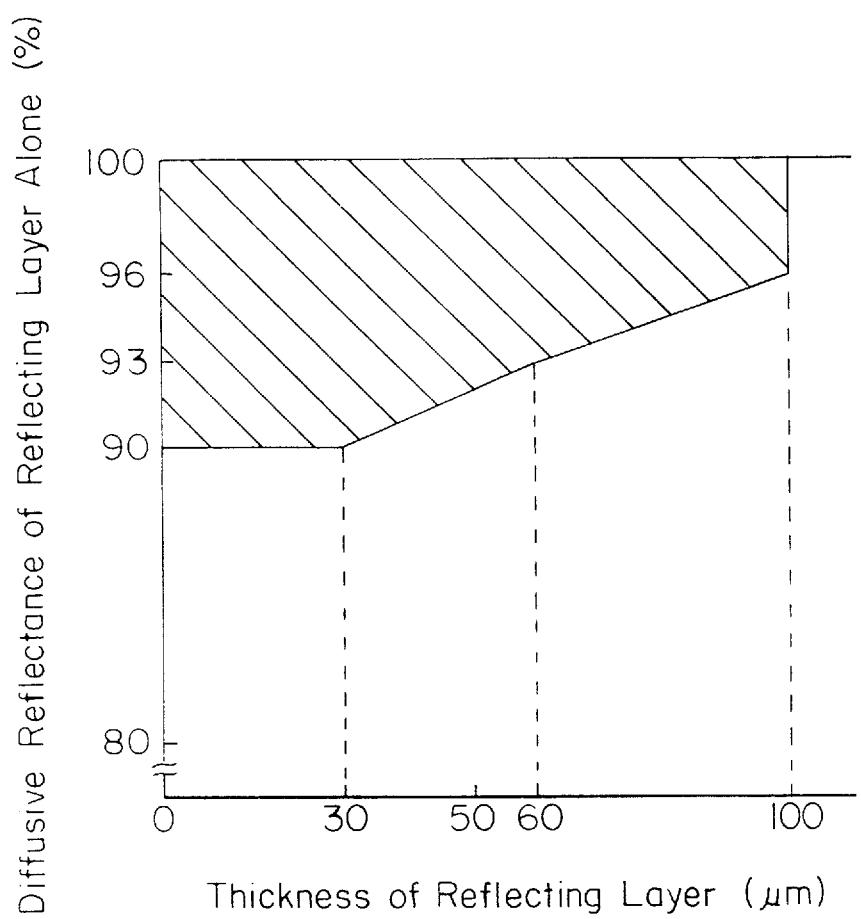
FIG. 1 shows a preferred relationship between the thickness of the light-reflecting layer of the radiographic intensifying screen of the invention and the diffusive reflectance of its light-reflecting layer by the shadow area.

As described hereinbefore, most radiographic intensifying screens are composed of a support, a light-reflecting layer, a phosphor layer and a surface-protective layer which are arranged in order.

In order to accomplish the objects of the invention, it is important to impart a high reflectance to the light-reflecting layer. Therefore, the reflectance is preferred to be within the shadow area of FIG. 1. The reflectance indicated in the invention is measured on the light-reflecting layer alone, that is, the light-reflecting layer before covering it with the phosphor layer and the surface protective layer. The reflectance is a diffusive reflectance which is measured utilizing an integrating sphere over which a powder of $BaSO_4$ is uniformly coated. The reflectance can be determined in an auto-graphic recording spectrophotometer (U-3210, available from Hitachi Ltd.) by measuring a reflectance with reference to a standard reflecting board (210-0740) by utilizing an integrating sphere of 150 φ (150-0901). The wave-length for the measurement of reflectance is determined in view of the emission wavelength of the phosphor employed in the radiographic intensifying screen. If the emission has plural peaks or a broad peak, luminance values measured in various wavelength points are calculated to give a weighted average value.

The light-reflecting layer of the radiographic intensifying screen of the invention is further required to give a high sharpness of reflection in addition to the high sensitivity. The sharpness of reflection is essentially related to the thickness of the light-reflecting layer. In other words, the thinner the light-reflecting layer is, the better the reflection sharpness is. However, the reflectance lowers when the light-reflecting layer is made thin. Accordingly, it is necessary to prepare a light-reflecting layer to give a high reflectance with small thickness. It has been found that the relationship between the thickness of the light-reflecting layer and the reflectance should be in the shadow area of FIG. 1, so as to accomplish the object of the invention.

Examples of the known light-reflecting material employable for the formation of the light-reflecting layer are MgO, $Al_2O_3$, $SiO_2$, ZnO, $TiO_2$, $Nb_2O_5$, BaFBr, $BaSO_4$, ZnS and $PbCO_3$. If the radiographic intensifying screen of the invention is utilized as the front-side intensifying screen (which means that the intensifying screen is placed between the radiographic film and the object to be exposed to the X-ray radiation), the light-reflecting material should absorb less amount of X-ray radiation. From this viewpoint, light-reflecting material containing heavy atoms such as ZnO, $Nb_2O_5$, BaFBr, $BaSO_4$, ZnS and $PbCO_3$ are unfavorable as the light-reflecting material to be employed in the radiographic intensifying screen of the invention. In addition, the light-reflecting material to be employed in the invention should have a sufficiently large refractive index so as to give a high reflection sharpness in addition to the high reflectance. From this viewpoint, MgO, $Al_2O_3$, and $SiO_2$ are not preferred. Therefore, $TiO_2$ is preferably employed as the light-reflecting material of the radiographic intensifying screen of the invention. Most of the commercially available $TiO_2$ are classified into two groups, that is, those having anatase structure and those having rutile structure. The titanium dioxide of rutile type is more preferred because it has a higher refractive index.

The particle size of the light-reflecting titanium dioxide should be small so as to give the desired light-reflecting layer of the invention which has a small thickness but shows a high light reflectance. It has been found that the mean particle size should be 0.5 μm or less, preferably is in the range of 0.1 to 0.4 μm, more preferably is in the range of 0.2 to 0.3 μm.

The titanium dioxide may be coated on its surface with $Al_2O_3$, $SiO_2$ or the like to show good dispersibility. Further, the titanium dioxide may contain other metal atoms such as potassium, provided that the desired whiteness is maintained.

The content of the light-reflecting material in the light-reflecting layer is also important in the radiographic intensifying screen of the invention so that the desired high reflectance can be obtained under the condition that the thickness of the light-reflecting layer is kept thin. The volume content (that is, the content expressed in terms of volume) of the light-reflecting titanium dioxide is preferred to be not lower than 25%, more preferably not lower than 40%. From the viewpoint of mechanical strength, the volume content should not exceed 75%. The volume content is defined as a volume of the light-reflecting titanium dioxide per the total volume of the light-reflecting layer. The volume content can be adjusted by varying the ratio of the light-reflecting material and the binder. The high reflectance can be attained by increasing the content of the light-reflecting titanium dioxide, but the increased content or $TiO_2$ weakens the mechanical strength of the light-reflecting layer. Therefore, in order to compensate the decreased binder content, it is required to utilize an appropriate binder.

Generally, in direct exposure radiography, a couple of radiographic intensifying screens, that is, a front-side intensifying screen and a back-side intensifying screen, are employed in combination with a double sided radiographic film (i.e., a radiographic film having a photographic light-sensitive emulsion layer on both sides) so as to utilize the applied X-ray energy efficiently. The characteristics required for the front-side intensifying screen differ from those required for the back-side intensifying screen. The radiographic intensifying screen of the invention is more preferably employed as the front-side intensifying screen, though it can be utilized as the back-side intensifying screen.

The effect of increase of sharpness given by the provision of the light-reflecting layer of high reflective sharpness according to the invention is prominently observed when a phosphor layer of a small thickness is placed thereon. If a thick phosphor layer is used in combination, the sharpness is deteriorated in the phosphor layer. Therefore, the sharpness increasing effect given by the provision of the light-reflecting layer of the invention lowers by the use of the thick phosphor layer. The thin phosphor layer, however, decreases the sensitivity of the radiographic intensifying screen. In order to compensate thus decreased sensitivity, the light-reflecting layer of the invention is designed to show the high reflectance as described above.

Moreover, there is caused less problem in the relatively low sensitivity of the front side intensifying screen, because the front side intensifying screen is a shield from the standpoint of the back side intensifying screen. Therefore, the thin front side intensifying screen is advantageous for increasing the sensitivity of the back side intensifying screen. Therefore, the relatively thin radiographic intensifying screen of the invention is advantageously employable as the front side intensifying screen.

For the above reason, in the thin radiographic intensifying screen of the invention, little disadvantageous decrease of sensitivity is observed, and the increased reflective sharpness is clearly observed by the use of both the thin light-reflecting layer and the thin phosphor layer of the invention. This means that the invention provides a new idea to efficiently utilize the emission of the phosphor particles on the bottom side to increase the sensitivity with little decrease of sharpness. This idea is clearly different from the conventionally employed idea for increasing the sensitivity based on merely increasing the reflectance of the light-reflecting layer.

The emission taken out of the phosphor particles on the bottom side in the phosphor layer of the radiographic intensifying screen is that caused by X-rays which are not adversely influenced in their sharpness by Compton effect. Such emission further gives a favorable effect to the increase of sharpness.

Therefore, it is surprising that the use of the specific light-reflecting layer in place of the carbon black-containing light-absorbing layer in the radiographic intensifying screen of the invention is effective to give both the desired high sensitivity and the desired high sharpness.

It may be considered that the light-reflecting layer having titanium dioxide particles in a high content is disadvantageous to the adhesion between the support and the light-reflecting layer as well as the adhesion between the light-reflecting layer and the phosphor layer. It is further surprising that no troubles are observed in these adhesions. This is because the thinner radiographic intensifying screen shows less rigidity due to the thin phosphor layer and runs with flexible movement, even when certain bending force is applied to. Heretofore, a radiographic intensifying screen of high sensitivity type should have a thick phosphor layer so as to increase the amount of the emission produced by the phosphor. The thick phosphor layer sometimes causes troubles in the adhesion between the phosphor layer and the underlying light-reflecting layer. Such troubles of adhesion lower durability of the radiographic intensifying screen and sometimes disturb practical use of the high sensitive radiographic intensifying screen. Thus, the radiographic intensifying screen of the invention which gives a high sensitivity as well as a high sharpness using a thin phosphor layer is advantageous even in the viewpoint of durability.

A great number of phosphors employable for a radiographic intensifying screen are known. Among them, the terbium activated phosphor of the following formula is preferably employed in the radiographic intensifying screen of the invention:

$$M_2O_2X:Tb$$

in which M is selected from the group consisting of yttrium, gadolinium and lutetium, and X is a chalcogen atom such as sulfur (S), selenium (Se), and tellurium (Te).

The above phosphor shows high X-ray absorption and a high emission efficiency. Moreover, the terbium activated phosphor favorably gives an emission in the wavelength region of longer than 430 nm, which is advantageous because titanium dioxide, particularly, $TiO_2$ of rutile type, does not absorb such emission of a longer wavelength. On the contrary, $CaWO_4$, $YTaO_4$, $YTaO_4$:Nb, LaOBr:Tm, BaSO$_4$:Pb, ZnS:Ag, BaSO$_4$:Eu, YTaO$_4$:Tm, BaFCl:Eu, BaFBrI:Eu, and the like, which give emission of shorter wavelength and are conventionally employed as phosphors of radiographic intensifying screens are not appropriately employed in the radiographic intensifying screen of the invention.

Accordingly, preferred examples of the phosphors to be employed in the radiographic intensifying screen of the invention are terbium activated rare earth oxysulfide phosphors such as Y$_2$O$_2$S:Tb, Gd$_2$O$_2$S:Tb, La$_2$O$_2$S:Tb, (Y,Gd)$_2$O$_2$S:Tb, (Y,Gd)$_2$O$_2$S:Tb,Tm. Most preferred is a terbium activated gadolinium oxysulfide having the formula of Gd$_2$O$_2$S:Tb, which is described in detail in U.S. Pat. No. 3,725,704.

Next, the relative sensitivity is described.

The relative sensitivity is determined in the following manner.

The commercially available radiographic film (UR-2 film, available from Fuji Photo Film Co., Ltd.) is placed between a couple of radiographic intensifying screens to be tested. The radiographic exposure amount is varied according to the distance varying method and the step exposure is performed at intervals of log E=0.15. The front side intensifying screen is that which is placed on the side facing the radiation source.

In the measurement, X-ray tube DRX-3724HD (available from Toshiba Co., Ltd.) is used in combination with a tungsten target. Focal spot size is 0.6 mm×0.6 mm. X-rays are radiated through aperture and an aluminum equivalent material of 3 mm thick. In a pulse generator, a voltage of 80 KVp is applied (three phases), and the X-rays are passed through a water filter of 7 cm thick (which corresponds to a human body in its X-ray absorption) to give a light source.

The radiographic film having been exposed to the X-rays is processed in an automatic developer of roller type (FRM-5000, available from Fuji Photo Film Co., Ltd.) using a developing solution (RD-3, available from Fuji Photo Film Co., Ltd.) at 35° C. and a fixing solution F (a mixture of 200 mL of aqueous ammonium thiosulfate solution (70% wt/vol), 20 g of sodium sulfite, 8 g of boric acid, 0.1 g of disodium ethylenediaminetetracarboxylate (dihydrate), 15 g of aluminum sulfate, 2 g of sulfuric acid, and 22 g of glacial acetic acid in water: total one liter, pH 4.5) at 25° C., to give a sample for measurement.

The sample is measured in its optical density with a visible light to give a characteristic curve. Then a reciprocal number of an exposure amount of X-rays to give an optical density of 1.8 is determined to give a sensitivity. The sensitivity is given in terms of a relative value. The reference of sensitivity (which gives a relative sensitivity of 100) is obtained by the use of a commercially available radiographic intensifying screen (HR-4, available from Kasei Optonics Co., Ltd.).

Subsequently, the measurement of CTF (i.e., contrast transfer function) is explained.

CTF of a combination of front-side and back-side radiographic intensifying screens can be determined by exposing a double-sided radiographic film. In the determination process, CTF is influenced not only by the combined screens but also the cross-over of the radiographic film employed in combination. Accordingly, the determination of CTF in the invention is performed using a commercially available radiographic film having a cross-over of 14% (the measurement of cross-over is described hereinafter). Such radiographic films are commercially available from Fuji Photo Film Co., Ltd., under trade names of UR-1 and UR-2.

The measurement is done on the UR-2 radiographic film which is placed at a distance of 2 mm from the X-ray source and between the front side and back side radiographic intensifying screens, using a rectangular chart for MTF measurement (made of molybdenum, thickness: 80 $\mu$m, spatial frequency: 0 line/mm to 10 lines/mm). The X-ray source and the conditions of development are the same as those described for the measurement of sensitivity. The exposure amount is controlled by varying the X-ray exposure time to give an optical density of 1.8 on the unshielded area.

The sample is then scanned using a microdensitometer. As the aperture, a slit (30 $\mu$m in the scanning direction, 500 $\mu$m in the direction perpendicular to the scanning direction) is used for preparing a density profile at sampling intervals of 30 $\mu$m. The scanning is performed as much as twenty times to obtain a mean value. The obtained mean values are employed to prepare a basic density profile for the calculation of CTF. From the basic density profile, a peak of a rectangular wave is detected for each frequency, and a density contrast is calculated for each frequency.

The density contrast at a spatial frequency of 0 cy/mm is normalized to 1, and a density contrast at each frequency is determined. The determined value is CTF.

The cross-over of the double-sided radiographic film which is employed for the measurement of CTF is determined in terms of % by the method described by Abbot et al in U.S. Pat. No. 4,425,425. The details are as follows.

A silver halide radiographic film is placed between a radiographic intensifying screen (HR-4, employing terbium activated gadolinium oxysulfide phosphor which emits a green light, main emission peak: 545 nm) and a black paper sheet. Then, X-rays are applied onto the black paper sheet. The X-ray source is the same as that used for sensitometry. The exposure amount is varied by varying the distance between the X-ray source and the film-screen combination. After the X-rays are applied, the radiographic film is developed in the same manner as that used for the measurement of sensitivity. The developed film is divided into two pieces, of which sensitive layers are peeled off. The optical density on the sensitive layer having been in contact with the intensifying screen should be high, in comparison with the optical density on the reverse side. Characteristic curves are prepared for the peeled-off sensitive layers. The mean difference of sensitivity ($\Delta$ log E) is obtained within the region of straight line in these characteristic curves. Subsequently, the cross-over is calculated from the following equation:

Cross-over (%)=100/[antilog($\Delta$log E)+1]

As described before, the CTF of the radiographic intensifying screen of the invention is defined by the measurement using a radiographic film of 14% cross-over.

The preparation of the radiographic intensifying screen of the invention is described below.

The light-reflecting layer is formed on a support.

There no specific limitation with respect to material of the support. Examples of the supports include sheets of polymers such as cellulose acetate, polyester such as polyethylene terephthalate, polyamide, polyimide, cellulose triacetate, and polycarbonate; metal sheets such as aluminum foil and aluminum alloy foil; an ordinary paper sheet; a resin-coated paper sheet; a pigment-containing paper sheet such as a paper sheet containing titanium dioxide; a sized paper sheet such as a paper sheet sized with polyvinyl alcohol; sheets of ceramics such as aluminum, zirconia, magnesia and titania; and a glass plate. The polymer sheet can contain therein a pigment such as titanium dioxide. The support may have an adhesive subbing layer thereon.

The light-reflecting layer is formed on the support by preparing a dispersion of the aforementioned fine titanium dioxide powder in a binder solution, coating the dispersion on the support, and drying the coated dispersion layer. The volume ratio between the phosphor and the binder is set to meet the requirement of the invention. As for the binder and the method for the preparation of the dispersion, explanation shall be given later with respect to the formation of the phosphor layer.

The phosphor layer is formed on the light-reflecting layer of the support at an atmospheric pressure in the known manner described below. A powdery phosphor and a binder are mixed and dispersed in an appropriate solvent to form a phosphor dispersion. The phosphor dispersion is then coated on the support via the light-reflecting layer at an atmospheric pressure using known coating means such as doctor blade, roll coater, or knife coater. The coated layer is dried to remove the solvent. Otherwise, the dispersion is once coated on a temporary substrate such as a glass sheet at an atmospheric pressure; the solvent is evaporated from the coated layer; thus formed phosphor layer is separated from the temporary substrate; and the separated phosphor layer is placed on the light-reflecting layer using an adhesive.

It is preferred that the phosphor layer is separately prepared and then subjected to compression treatment before or simultaneously with the lamination on the light-reflecting layer of the support. The compression treatment is done for increasing the packing density of the phosphor layer so as to decrease pore volume of the phosphor layer. The phosphor layer having less pore volume shows a high sensitivity and a high sharpness.

The preferred phosphor layer is prepared by the following steps:

a) forming a phosphor sheet comprising a binder and phosphor particles; and b) fixing the phosphor sheet onto the light-reflecting layer of the support by laminating the phosphor sheet on the reflecting layer at a temperature higher than the softening or melting temperature of the binder under pressure.

In the step a), the binder and phosphor particles are placed into an appropriate solvent and stirred to give a dispersion in which the phosphor particles are dispersed uniformly in a binder solution.

The binder preferably is a thermoplastic elastomer having a softening or melting point in the range of 30° to 150° C. The thermoplastic elastomer has an appropriate elastic property at an ambient temperature and fluidity at an elevated temperature. Therefore, the thermoplastic elastomer is able to keep the phosphor particles from breakage when the phosphor particles are compressed at an elevated temperature. Examples of the thermoplastic elastomers include polystyrene, polyolefin, polyurethane, polyester, polyamide, polybutadiene, ethylene/vinyl acetate copolymer, poly(vinyl chloride), natural rubber, fluorinated rubber, polyisoprene, chlorinated polyethylene, styrene/butadiene rubber, and silicon rubber. The thermoplastic elastomer can be employed singly or in combination with other polymers. It is appropriate to use the thermoplastic elastomer in an amount of not less than 10 weight %. However, the thermoplastic elastomer is preferably used in an amount as much as possible up to 100 weight %.

Examples of the solvents to be employed for the preparation of the phosphor dispersion include lower alcohols such as methanol, ethanol, n-propanol, and n-butanol; chlorinated hydrocarbons such as methylene chloride and ethylene chloride; ketones such as acetone, methyl ethyl ketone, and methyl isobutyl ketone; esters of lower carboxylic acids and lower alcohols such as methyl acetate, ethyl acetate, and butyl acetate; ethers such as dioxane, ethylene glycol monoethyl ether, ethylene glycol monomethyl ether; and their mixtures.

In the phosphor dispersion, the ratio of the binder to phosphor can be determined in consideration of the purpose of the intensifying screen to be prepared and the natures of the phosphor particles employed. Generally, the ratio is in the range of 1:1 to 1:100 (binder:phosphor, weight ratio), preferably 1:8 to 1:40.

The phosphor dispersion may further contain one or more of auxiliary additives such as dispersing agents and plasticizers. Examples of the dispersing agents include phthalic acid, stearic acid, caproic acid, and a lipophilic surfactant. Examples of the plasticizers include phosphoric acid esters such as triphenyl phosphate, tricresyl phosphate, and diphenyl phosphate; phthalic acid esters such as diethyl phthalate and dimethoxyethyl phthalate; glycolic acid esters such as ethylphthalylethyl/glycolate and butylphthalylbutyl glycolate; and polyesters of polyethylene glycol and aliphatic dibasic acid such as polyester of triethylene glycol and adipic acid, and polyester of diethylene glycol and succinic acid.

The phosphor dispersion is then coated uniformly on a temporary substrate for preparing the desired phosphor sheet. The coating can be done by the conventional method using a doctor blade, roll coater, knife coater, or the like. The temporary substrate may be a glass plate, a plastic sheet, a metal sheet, a ceramic sheet, a polymer-coated paper sheet, or the like. The temporary substrate preferably has a releasing layer on its surface.

The phosphor dispersion coated on the temporary substrate is then dried and peeled off from the substrate to give a phosphor sheet.

In the second step, the phosphor sheet obtained in the step a) is laminated on the light-reflecting layer of the support at an elevated temperature under pressure. This is compressive lamination. In this process, the phosphor sheet is heated to a temperature higher than the softening or melting point of the binder polymer employed.

At the beginning of the compressive lamination, the phosphor sheet is heated to soften and compressed to extend over the light-reflecting layer. Then, the phosphor sheet is fixed onto the light-reflecting layer. Therefore, the phosphor sheet is compressed to increase the packing density with less breakage of the phosphor particles. The compression can be done using a calendar roll. For instance, the compression treatment using a calendar roll is described. Initially, the phosphor sheet is placed on the light-reflecting layer of the support. Thus produced composite is passed between a set of heated rolls under pressure. The pressure applied preferably is 50 kgw/cm$^2$ or higher.

On the phosphor layer is placed a transparent protective layer.

The transparent protective layer is prepared using known polymers. Examples of the polymer of the protective layer include cellulose derivatives such as cellulose acetate and nitrocellulose; and synthetic polymers such as poly(methyl methacrylate), poly(vinyl butyral), poly(vinyl formal), polycarbonate, poly(vinyl acetate), vinyl chloride/vinyl acetate copolymer, and fluororesin (fluorine atom-containing polymer). The polymer is dissolved in an appropriate solvent to give a polymer solution, which is then coated over the phosphor layer. Among these polymers, the fluororesin is preferred because it effectively keeps the underlying phosphor layer from staining with impurities such as plasticizers transferred from other members of the radiographic image-producing system.

The protective layer can be arranged on the phosphor layer by laminating a separately prepared polymer film such as a film of polyethylene terephthalate, polyethylene, poly (vinylidene chloride), or polyamide. The polymer film can be fixed onto the phosphor layer using an adhesive.

The protective layer preferably has a thickness in the range of 3 to 20 μm.

The radiographic intensifying screen of the invention shows an increased sharpness almost in whole sensitivity region. Particularly effective is in the region of the sensitivity of 250 or higher.

The quality of radiographic image is determined by radiographic quantum noise. This means that the increased sharpness brings about deterioration of graininess. Therefore, if the sharpness is at a satisfactory level, the improvement is generally directed to make the graininess better so that the radiographic image can be easily and clearly observed in the clinical examination. However, in the region of high sensitivity, it is rather difficult to give a sharp radiographic image.

The radiographic intensifying screen can favorably give an improved sharpness such as CTF (contrast transfer function) of 0.4 or more even in the high relative sensitivity region such as 250 or higher. Further, the CTF can be more improved to 0.42 or more by the use of the radiographic intensifying screen of the invention.

The invention is further described by the following examples.

EXAMPLE 1

Preparation and Evaluation of Light-Reflecting Layer (1) Preparation of support having titanium dioxide-containing light-reflecting layer In methyl ethyl ketone were placed 500 g of a titanium dioxide powder (rutile type, mean particle size: 0.28 μm, CR95 available from Ishihara Sangyou Co., Ltd.) and 100 g of an acrylic type binder (Criscoat P1018GS, available from Dainippon Ink and Chemicals Co., Ltd.). The mixture was stirred to give a dispersion having a viscosity of 10 PS. In the dispersion, the ratio of binder: titanium dioxide ($TiO_2$) was 1:5 (weight ratio). The dispersion was uniformly coated on a transparent polyethylene terephthalate support (thickness: 250 μm) by a doctor blade and dried to give a dry titanium dioxide-containing layer which had the thickness of 12 to 65 μm (set forth in Table 1) and the $TiO_2$ volume ratio of 44 to 48%. Thus prepared light-reflecting layer on the support (A-1 to A-5 in Table 1) had a smooth and uniform surface, and no agglomerated titanium dioxide particles were observed.

The same procedures were repeated using the same binder and titanium dioxide particles but changing their weight ratio into 1:1 (by weight), to prepare a light-reflecting layer (A-6 in Table 1, thickness: 30 μm, $TiO_2$ volume ratio: 22%). Thus prepared light-reflecting layer on the support (A-6) had a smooth and uniform surface, and no agglomerated titanium dioxide particles were observed.

The same procedures were repeated using the same binder but using different titanium dioxide particles (mean particle size: 0.7 μm or 1.5 μm), to prepare a light-reflecting layer (A-7 to A-9 in Table 1, thickness: set forth in Table 1). Thus prepared light-reflecting layer or the support (A-6) had a smooth and uniform surface, and no agglomerated titanium dioxide particles were observed.

As a reference, the commercially available titanium dioxide-containing support (Lumilar E-20 #250, thickness: 250 μm, $TiO_2$ volume ratio: less than 20%, available from Toray Co., Ltd., A-10 in Table 1) was employed.

(2) Measurement of reflectance on $TiO_2$-containing light-reflective layer on support The $TiO_2$-containing light-reflective layer on support (A-1 to A-9) and the $TiO_2$-containing support (A-10) was subjected to measurement of reflectance in a commercially available spectrophotometer (U32LO type, from Hitachi, Ltd.). The measurement of reflectance was done at wavelengths of 545 nm, 550 nm, 590 nm, 490 nm, 438 nm, 415 nm, and 385 nm. These wavelengths were chosen in consideration of the use of a phosphor layer of terbium activated gadolinium oxysulfide in combination. The measured reflectances were calculated to give a weighted mean value. The resulting mean value was the desired reflectance.

TABLE 1

| Sample | Binder/ $TiO_2$ | thickness (μm) | Titanium dioxide (μm) | (mg/cm²) | (%) | Reflectance (%) |
|---|---|---|---|---|---|---|
| A-1 | 1:5 | 12 | 0.28 | 2.3 | 48 | 83 |
| A-2 | 1:5 | 23 | 0.28 | 4.4 | 48 | 91 |
| A-3 | 1:5 | 30 | 0.28 | 5.8 | 48 | 93.5 |
| A-4 | 1:5 | 40 | 0.28 | 7.5 | 47 | 95 |
| A-5 | 1:5 | 65 | 0.28 | 11.5 | 44 | 96.5 |
| A-6 | 1:1 | 30 | 0.28 | 2.6 | 22 | 88 |
| A-7 | 1:5 | 30 | 0.7 | 6.0 | 50 | 87 |
| A-8 | 1:5 | 30 | 1.5 | 6.2 | 52 | 85 |
| A-9 | 1:5 | 60 | 1.5 | 11 | 46 | 92 |
| A-10 | — | 250 | — | — | >20 | 89 |

Figure 2:
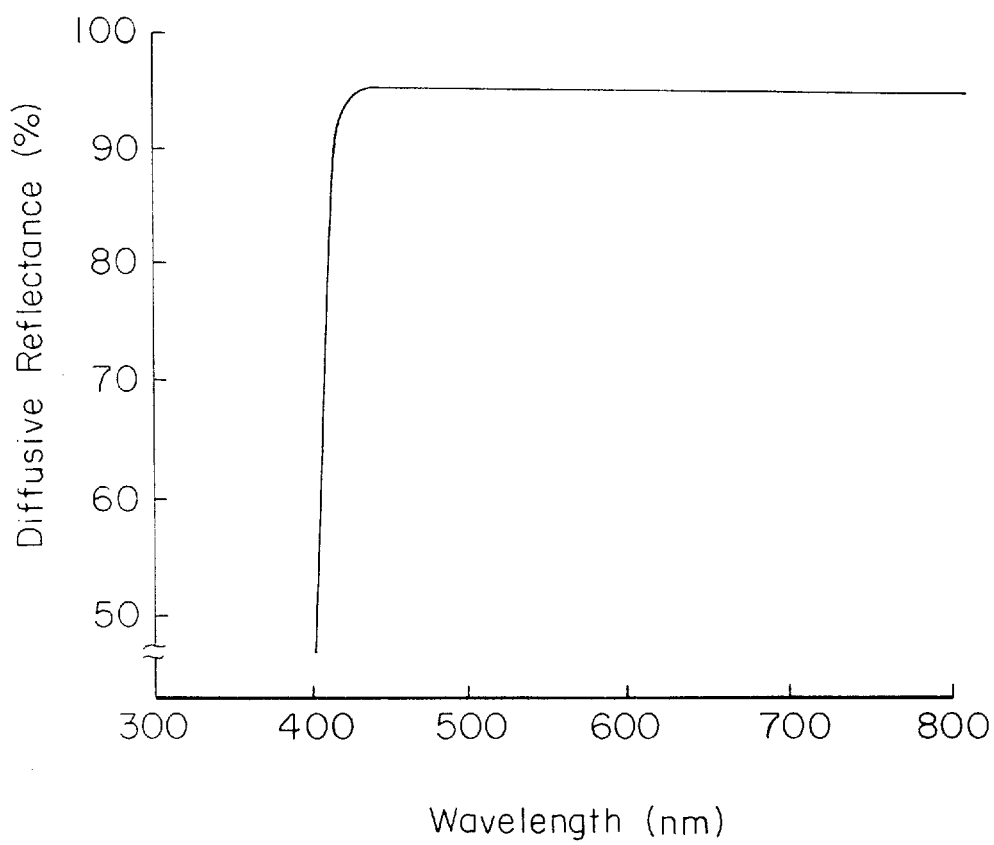
FIG. 2 graphically indicates a spectral reflectance (diffusive reflectance) of the titanium dioxide-containing light-reflecting layer provided on a support according to the invention.

Remarks:
thickness: thickness of dry layer
(μm): particle size of $TiO_2$
(mg/cm²): coated amount of $TiO_2$
(%): volume ratio of $TiO_2$ in the layer In FIG. 2, the spectral reflectance (diffusive reflectance) on the sample A-4 (support having titanium dioxide-containing light-reflecting layer, according to the present invention) is shown. It is noted that the reflectance is higher in the wavelength region of longer than approx. 430 nm.

EXAMPLE 2

Preparation and Evaluation of Radiographic Intensifying Screen (1) Preparation of phosphor sheet In methyl ethyl ketone were placed 250 g of particles of $Gd_2O_2S$:Tb phosphor (mean particle size: 3.5 μm), 8 g of polyurethane binder (Pandex T5256, available from Dainippon Ink and Chemicals Co., Ltd.), 2 g of epoxy resin binder (Epikote 1001, available from Yuka Shell Epoxy Co., Ltd.) and 0.5 g of polyisocyanate (Colonate HX, available from Japan Polyurethane Industries Co., Ltd.). The mixture was stirred by means of a propeller mixer to give a phosphor dispersion having a viscosity of 25 PS (at 25° C.). The phosphor dispersion was coated on a temporary substrate (polyethylene terephthalate sheet having a silicone layer for easiness of release), dried, and peeled off from the substrate. Thus a phosphor sheet having a thickness in the range of 70 to 150 μm (set forth in Table 2) was prepared.

(2) Lamination of phosphor sheet on light-reflecting layer of support

The above-prepared phosphor sheet was placed on the titanium dioxide-containing light-reflecting layer of the support (Sample A-1) prepared in Example 1, and passed through heated rollers of a calendar roller at 80° C. under the pressure of 400 kgw/cm², to prepare a composite of a support, a light-reflecting layer and a phosphor layer (B-1 to B-5 in Table 2). The phosphor layer showed a $TiO_2$ volume ratio of 68% after it was processed in the calendar roller.

The same procedures were repeated using the commercially available titanium dioxide-containing support (A-10 in Example 1) in place of the support having the titanium dioxide-containing light-reflecting layer, to prepare a composite of a support, a light-reflecting layer and a phosphor layer (B-6 to B-10 in Table 2).

TABLE 2

| Sample | Support | TiO$_2$ Volume ratio | Phosphor layer | Remarks |
|---|---|---|---|---|
| B-1 | A-4 | 47% | 70 μm | Inventive |
| B-2 | A-4 | 47% | 90 μm | Inventive |
| B-3 | A-4 | 47% | 110 μm | Inventive |
| B-4 | A-4 | 47% | 130 μm | Comparative |
| B-5 | A-4 | 47% | 150 μm | Comparative |
| B-6 | A-10 | >20% | 70 μm | Comparative |
| B-7 | A-10 | >20% | 90 μm | Comparative |
| B-8 | A-10 | >20% | 110 μm | Comparative |
| B-9 | A-10 | >20% | 130 μm | Comparative |
| B-10 | A-10 | >20% | 150 μm | Comparative |

(3) Formation of surface protective layer

In a mixture of methyl ethyl ketone and cyclohexanone (1:1, by weight) were dissolved 10 g of fluororesin (Lumiflon LF100, available from Asahi Glass Works Co., Ltd.), 1.5 g of alcohol modified-siloxane oligomer (X-22-2809, available from Sin-Etsu Chemical Industries, Co., Ltd.), 3.2 g of polyisocyanate (Olester NP-38-70S, available from Mitsui-Toatsu Chemical Industries Co., Ltd.), and 0.001 g of catalyst (KS1269, available from Kyodo Yakuhin Co., Ltd.) to prepare a fluororesin solution. The fluororesin solution was coated on the phosphor layer of Samples B-1 to B-10 using a doctor blade and slowly dried. The dried layer was heated to 120° C. for 30 minutes to cure the layer. Thus, a protective layer of 6 μm thick was placed to give a radiographic intensifying screen.

(4) Measurement of sensitivity and sharpness

The sensitivity and sharpness were measured using a combination of a radiographic film, the above-prepared radiographic intensifying screen (B-1 to B-10) on the front side, and a commercially available radiographic intensifying screen (HGM, available from Kasei Optonics Co., Ltd.) on the back side. The radiographic film was UR-2 (for direct exposure radiography for clinical examination, available from Fuji Photo Film Co., Ltd.). For the measurement, a rectangular chart for MTF measurement (made of molybdenum, thickness: 80 μm, spatial frequency: 0 line/mm to 10 lines/mm) was employed (placed at 2 m from the position of X-ray tube).

In the measurement, X-ray tube DRX-3724HD (available from Toshiba Co., Ltd.) was used in combination with a tungsten target. Focal spot size was 0.6 mm×0.6 mm. X-rays were radiated through an aperture and an aluminum equivalent material of 3 mm thick. In a pulse generator, a voltage of 80 KVp was applied (three phases), and the X-rays were passed through a water filter of 7 cm thick (which corresponds to a hug body in its X-ray absorption) to give a light source.

The radiographic film having been exposed to the X-rays was processed in an automatic developer of roller type (FRM-5000, available from Fuji Photo Film Co., Ltd.) using a developing solution (RD-3, available from Fuji Photo Film Co., Ltd.) at 35° C. and a fixing solution F (a mixture of 200 mL of aqueous ammonium thiosulfate solution (70% wt/vol), 20 g of sodium sulfite, 8 g of boric acid, 0.1 g of disodium ethylenediaminetetracarboxylate (dihydrate), 15 g of aluminum sulfate, 2 g of sulfuric acid, and 22 g of glacial acetic acid in water: total one liter, pH 4.5) at 25° C., to give a sample for measurement. The amount of exposure to X-rays was set to give a mean optical density (i.e., a mean value of the maximum optical density and minimum optical density after the development) of 1.0.

The developed sample was then scanned using a microdensitometer. As the aperture, a slit (30 μm in the scanning direction, 500 μm in the direction perpendicular to the scanning direction) was used for preparing a density profile at sampling intervals of 30 μm. The scanning was performed as much as twenty times to obtain mean values. The obtained mean values were employed to prepare a basic density profile for the calculation of CTF. From the basic density profile, a peak of a rectangular wave was detected for each frequency, and a density contrast is calculated for each frequency.

The density contrast at a spatial frequency of 0 cy/mm was normalized to 1, and a density contrast at each frequency (i.e., CTF) was determined.

The value at 2 lines/mm was adopted as a representative value.

The X-source and radiographic film employed for the CTF determination were utilized, and the step exposures at a step of log E=0.15 were performed by varying the distance. After the exposure was complete, the radiographic film was developed under the same conditions as those adopted for the CTF determination, to give a sample for evaluation. The sample was subjected to measurement of optical density using a visible light, to prepare a characteristic curve. A reverse value of the amount of X-ray exposure to give an optical density of $D_{min}$ 1.0 was adopted to express a relative sensitivity. The standard for the sensitivity evaluation was the value obtained in the measurement using a commercially available radiographic screen (HR-4, available from Kasei Optonics Co., Ltd.) on the front side. The obtained value was turned to 100. The obtained sensitivity and CTF (for sensitivity) are shown in FIG. 3.

Figure 3:
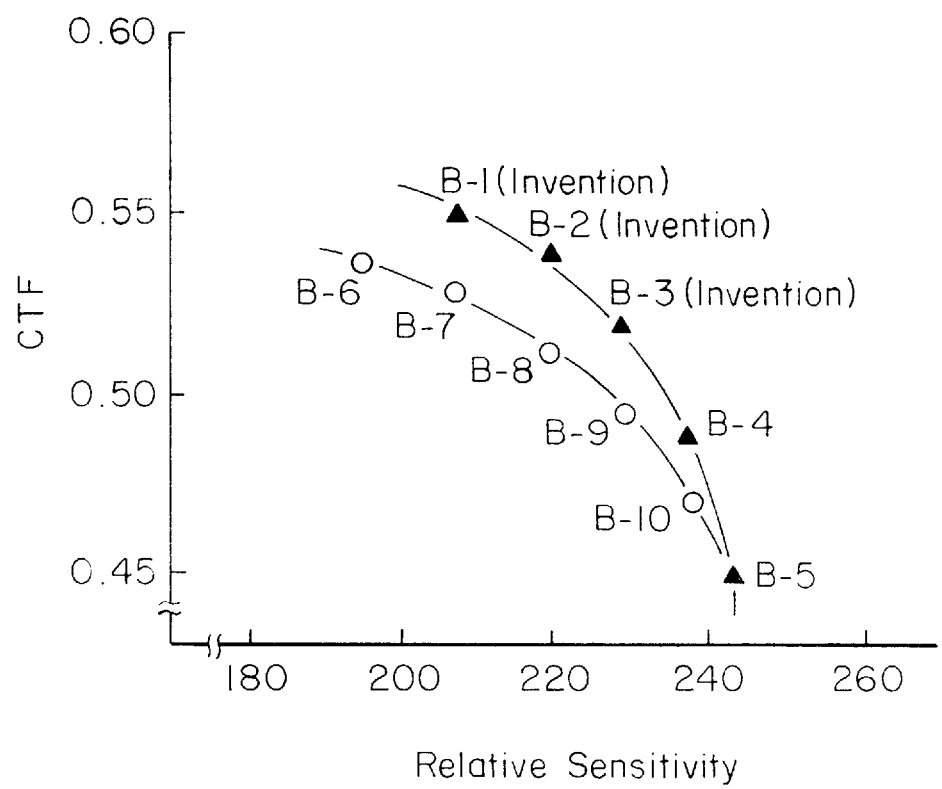
FIG. 3 is a graph showing a relationship between a relative sensitivity and a sharpness (indicated in terms of CTF) measured in a radiographic image producing system which uses the radiographic intensifying screen of Example 2 as the front-side intensifying screen.

The results of FIG. 3 indicate that the light-reflecting layer defined in the invention is specifically effective when it is used in combination with a thin phosphor layer having a thickness of not thicker than 120 μm (B-1 to B-3)

The same measurements were performed on sensitivity and sharpness (in terms of CTF) using the radiographic intensifying screen (B-1 to B-10) on the back side, and the HGM radiographic intensifying screen on the front side. The results are shown in FIG. 4 in which the reverse combinations of B-1* to B-10* correspond to the aforementioned combinations of B-1 to B-10, respectively.

Figure 4:
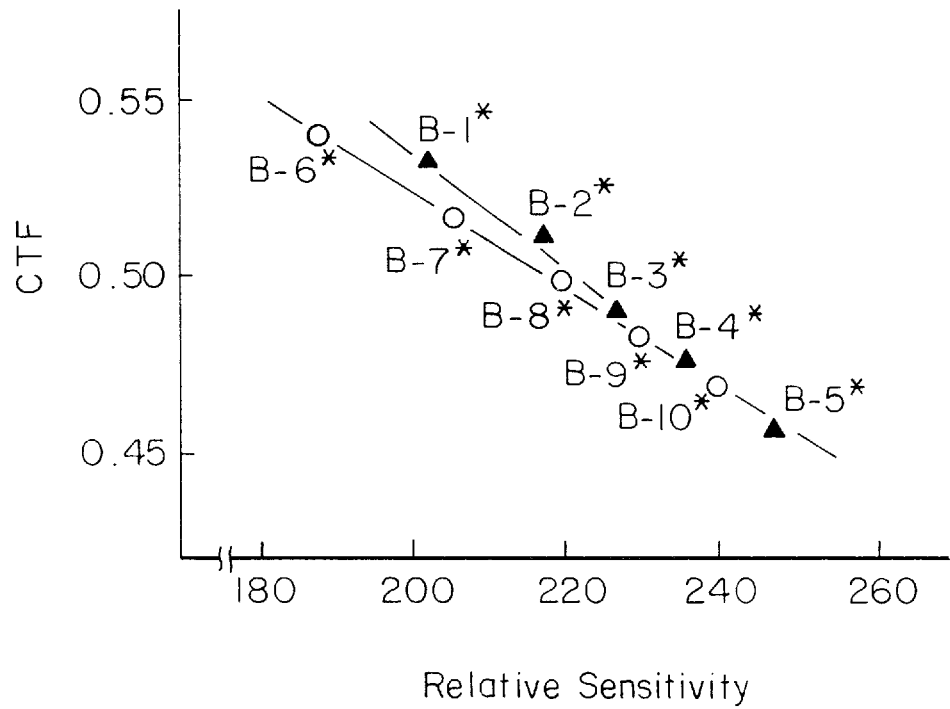
FIG. 4 is a graph showing a relationship between a relative sensitivity and a sharpness (indicated in terms of CTF) measured in a radiographic image producing system which uses the radiographic intensifying screen of Example 2 as the back-side intensifying screen.

The comparison between the results in FIG. 3 and FIG. 4 indicates that the radiographic intensifying screen of the invention is particularly advantageous when it is used as the front-side intensifying screen.

EXAMPLE 3

The radiographic intensifying screen sample (B-1 to B-10) prepared in Example 2 was subjected to evaluation for adhesion between the phosphor layer and the light-reflecting layer in the following manner.

The screen sample was cut to give a specimen of 1.5 cm×3 cm. The specimen was attached to the edge surface of the titanium dioxide-containing support (aforementioned A-10) and hit against a stainless steal plate under the same conditions to observe separation between the phosphor layer and the light-reflecting layer. The results were marked by the following criteria and set forth in Table 3:

AA: no separation is observed

BB: almost no separation is observed

CC: separation is sometimes observed

DD: separation is frequently observed (the corresponding intensifying screen cannot be employed in practice.)

TABLE 3

| Sample | Support | Phosphor layer | Adhesion | Remarks |
|---|---|---|---|---|
| B-1 | A-4 | 70 μm | AA | Inventive |
| B-2 | A-4 | 90 μm | AA | Inventive |
| B-3 | A-4 | 110 μm | BB | Inventive |
| B-4 | A-4 | 130 μm | CC | Comparative |
| B-5 | A-4 | 150 μm | DD | Comparative |
| B-6 | A-10 | 70 μm | AA | Comparative |
| B-7 | A-10 | 90 μm | AA | Comparative |
| B-8 | A-10 | 130 μm | BB | Comparative |
| B-9 | A-10 | 150 μm | BB | Comparative |
| B-10 | A-10 | 70 μm | BB | Comparative |

The results set forth in Table 3 indicate that the light-reflecting layer prepared according to the invention gives enough adhesion to the phosphor layer when it is used in combination with a thin phosphor layer such as that having a thickness of 120 μm or thinner. In contrast, if a thicker phosphor layer is placed on the light-reflecting layer, an enough adhesion (resistance to separation) is not given.

EXAMPLE 4

A phosphor layer of 90 μm thick was prepared in the same manner as in Example 2 and laminated on the light-reflecting layer of the support prepared in Example 1, to give a laminate of a support, a light-reflecting layer, and a thin phosphor layer, which is set forth in Table 4.

TABLE 4

| Sample | Support | Phosphor layer | Remarks |
|---|---|---|---|
| C-1 | A-1 | 90 μm | Comparative |
| C-2 | A-2 | 90 μm | Inventive |
| C-3 | A-6 | 90 μm | Comparative |
| C-4 | A-7 | 90 μm | Comparative |
| C-5 | A-8 | 90 μm | Comparative |
| C-6 | A-9 | 90 μm | Comparative |

The sample (C-1 to C-6) was evaluated in its sensitivity and sharpness (in terms of CTF) in the manner described in Example 2.

Figure 5:
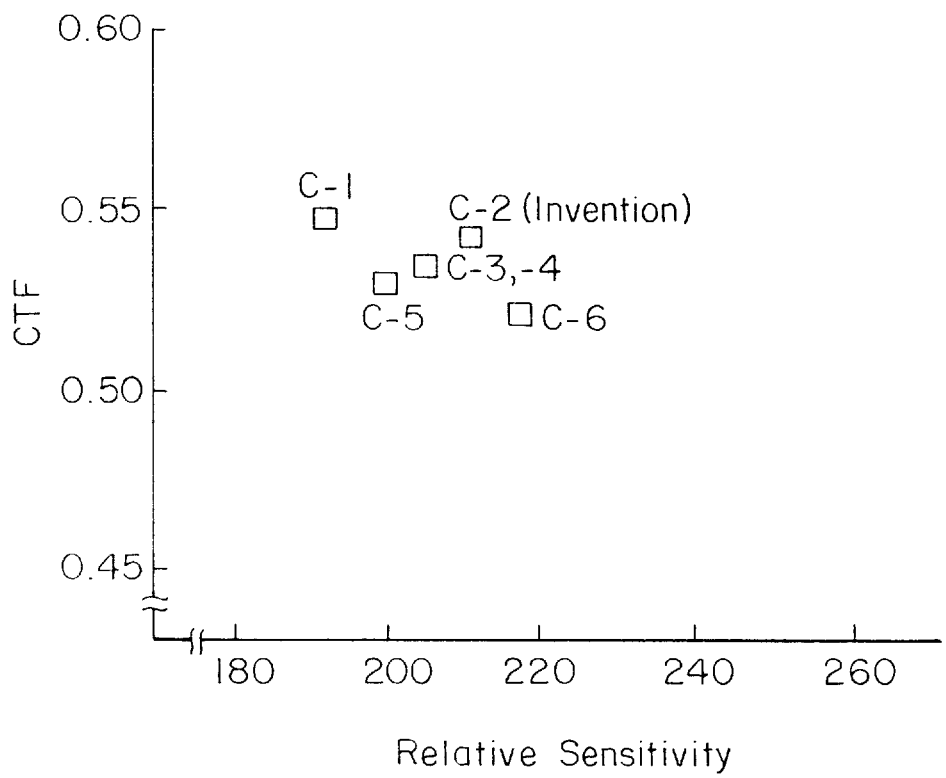
FIG. 5 is a graph showing a relationship between a relative sensitivity and a sharpness (indicated in terms of CTF) measured in a radiographic image producing system which utilizes the radiographic intensifying screen prepared in Example 4.

The results are shown in FIG. 5. The results indicate that the sample C-2 according to the present invention is most favorable in the balance between the sensitivity and sharpness.

EXAMPLE 5

As is apparent from the results shown in FIGS. 3 and 5, the radiographic intensifying screen of the invention gives increase of the sharpness even in the region of a relative sensitivity in the vicinity of 200.

If a more suitable radiographic intensifying screen is employed as the back-side screen in combination with the radiographic intensifying screen of the invention on the front side, it is expected to give a radiographic image of a high sharpness even in the region of a relative sensitivity of 250 or higher. An example of such advantageous combination is described in this Example 5.

(1) Preparation of radiographic intensifying screen A for back-side arrangement

A radiographic intensifying screen A for the back-side arrangement was prepared by forming a phosphor layer (180 μm thick, containing particles of $Gd_2O_2S$:Tb phosphor having a mean particle size of 4.5 μm) on the commercially available titanium dioxide-containing support (aforementioned A-10). The phosphor particles were contained in the formed phosphor layer in an amount of 72 volume %.

(2) Measurement of sensitivity and sharpness (CTF)

A radiographic image recording system was formulated using the front-side intensifying screen and the back-side intensifying screen set forth in Table 5. The radiographic film UR-2 (mentioned in Example 2) was employed for the system.

TABLE 5

| | Intensifying Screen | | X-ray | |
|---|---|---|---|---|
| System | Front-side | Back-side | film | Remarks |
| D-1 | HR-4 front | HR-4 back | UR-2 | Comparative |
| D-1 | HR-6 front | HR-6 back | UR-2 | Comparative |
| D-3 | HR-8 front | HR-8 back | UR-2 | Comparative |
| D-4 | HR-12 front | HR-12 back | UR-2 | Comparative |
| D-5 | HR-16 front | HR-16 back | UR-2 | Comparative |
| D-6 | HGM front | HGM back | UR-2 | Comparative |
| D-7 | HGM front | Screen A | UR-2 | Comparative |
| D-8 | B-2 | Screen A | UR-2 | Inventive |
| D-9 | B-3 | Screen A | UR-2 | Inventive |

Remarks: HR-6, HR-8, HR-12, and HR-16 were radiographic intensifying screens of various types commercially available from Fuji Photo Film Co., Ltd. The "front" and "back" attached to these screens mean that the intensifying screens were identified for the use as a front side screen and a back side screen, respectively.

The radiographic intensifying screens of HGM were commercially available from Kasei Optonics Co., Ltd. The meanings of "front" and "back" are the same as above.

The radiographic intensifying screens of B-2 and B-3 were prepared to embody the present invention. The radiographic screen A is described above.

Figure 6:
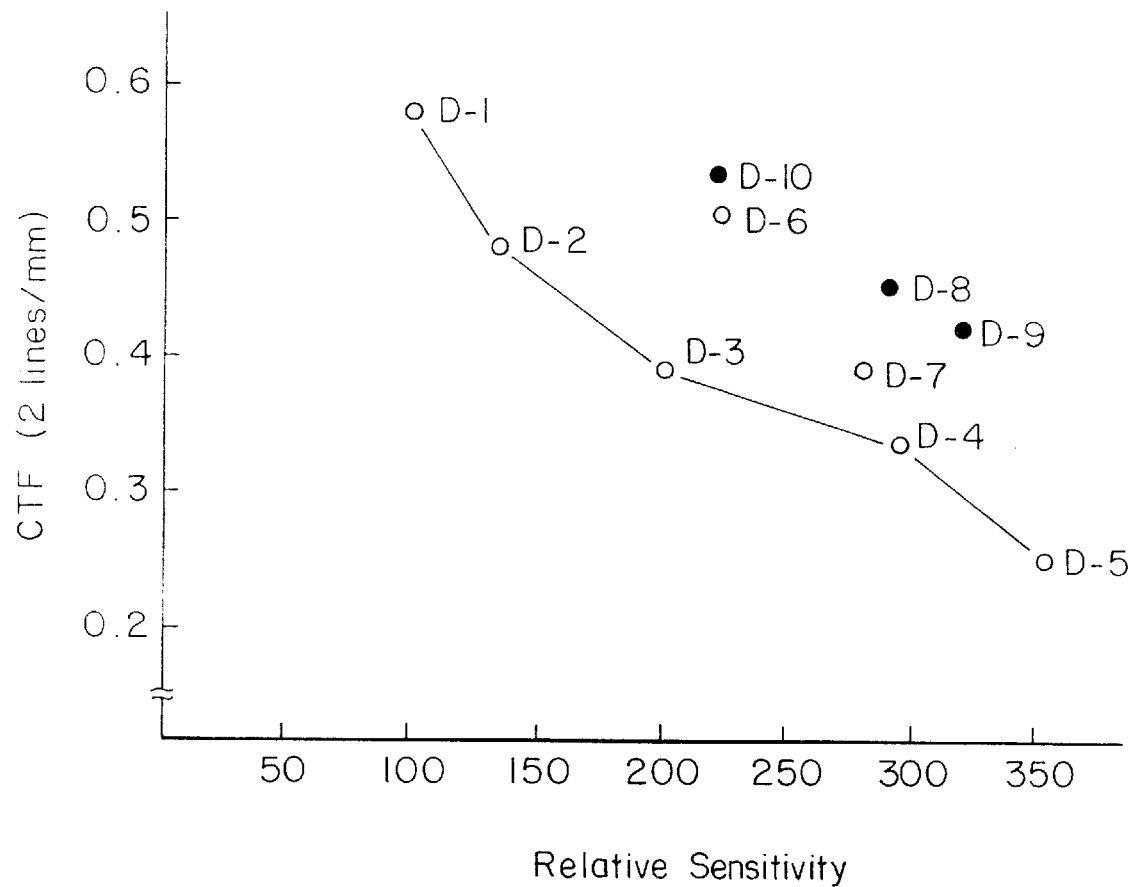
FIG. 6 is a graph showing a relationship between a relative sensitivity and a sharpness (indicated in terms of CTF) measured in a radiographic image producing system which utilizes various radiographic intensifying screens of Example 5 in combination with each other.

The results are shown in FIG. 6. From the results shown in FIG. 6, the radiographic image producing system using the combination D-8 of the radiographic intensifying screen B-2 (according to the invention) on the front side and the radiographic intensifying screen A on the back side, as well as the combination D-9 of the radiographic intensifying screen B-3 (according to the invention) on the front side and the radiographic intensifying screen A on the back side give an improved sharpness even in the relative sensitivity region of 250 or higher.

EXAMPLE 6

Evaluation in Practical Radiography (1)

The combinations D-8, D-7 and D-4 of the radiographic intensifying screens set forth in Example 5 were evaluated in the practical radiography using a chest phantom and a stomach phantom. These combination had almost the same relative sensitive region.

D-8: B-2(front side)/Screen A(back side)

D-7: HGM front(front side)/Screen A(back side)

D-4: HR-12 front(front side)/HR-12 back(back side)

The radiography using the chest phantom was performed at 130 KVp and using UR-1 radiographic film (product of Fuji Photo Film Co., Ltd.). The optical density in the lung area was set to 1.8. The radiography using the stomach phantom was performed at 80 KVp and using the UR-2 radiographic film.

The same developing conditions as those of Example 2 were adopted, and the obtained radiographic image was visually observed. It was confirmed that the quality of the radiographic image obtained in the D-8 system (which gives the highest CTF) was the best, and was advantageously employable for clinical examination. The quality of the image obtained in the D-7 system was better than the quality of the image obtained in the D-4 system. In contrast, the graininess worsened in the sequence of D-4, D-7 and D-8. However, even the radiographic image of D-8 showing the worst graininess was at the level which did not disturb the clinical observation.

The CTF at each spatial frequency obtained in the use of the B-2/Screen A combination (D-8) is set forth in Table 6.

TABLE 6

| Spatial Frequency (lines/mm) | CTF |
|---|---|
| 0 | 1.00 |
| 0.5 | 0.88 |
| 0.75 | 0.81 |
| 1.0 | 0.73 |
| 1.5 | 0.58 |
| 2.0 | 0.45 |
| 2.5 | 0.36 |
| 3.0 | 0.27 |
| 3.5 | 0.22 |
| 4.0 | 0.17 |
| 5.0 | 0.12 |
| 6.0 | 0.07 |

EXAMPLE 7

Evaluation in Practical Radiography (2)

The aforementioned combination D-6 of the radiographic intensifying screens set forth in Example 5 and the following combination D-10 of the radiographic intensifying screens (which had almost the same relative sensitive region around 200) were evaluated in the practical radiography using a chest phantom and a stomach phantom in the same manner as in Example 6.

D-10: B-2(front side)/HGM back(back side)

D-6: HGM front(front side)/HGM back(back side)

The results indicated that the radiographic image obtained in the use of D-10 combination was sharp as compared with the radiographic image obtained in the use of D-6 combination with respect to the stomach phantom. In both cases, the graininess was at a level which did not disturb the observation.

The radiographic image of the chest phantom was better in the case of D-10 combination in the sharpness than in the case of D-6 combination. The graininess of the image of D-10 combination was lower than that of the image of D-6, but was not troublesome.

The results obtained in Examples 6 and 7 indicate that the increase of sharpness provided by the use of the radiographic intensifying screen is most prominent in the region of a relative sensitivity of 250 or higher.

What is claimed is:

1. A radiographic intensifying screen comprising a support, a light-reflective layer, a phosphor layer and a surface protective layer in which the light-reflecting layer has a thickness of 15 to 100 μm and comprises 25 to 75 volume % of titanium dioxide particles having a mean particle size of 0.1 to 0.5 μm and a polymer binder, and the phosphor layer has a thickness of 40 to 120 μm and contains particles of a terbium activated phosphor having the formula of:

$$M_2O_2X: Tb$$

in which M is selected from the group consisting of yttrium, gadolinium and lutetium, and X is selected from the group consisting of sulfur, selenium and tellurium, the thickness of the light-reflecting layer and the diffusive reflectance of the light-reflecting layer having a relationship which is present within the shadow area of FIG. 1 of the attached drawings.

2. The radiographic intensifying screen of claim 1, wherein the titanium dioxide particles are of rutile structure and have a mean particle size in the range of 0.1 to 0.4 μm.

3. The radiographic intensifying screen of claim 1, wherein the phosphor is a terbium activated gadolinium oxysulfide.

4. A combination of a radiographic intensifying screen and the radiographic intensifying screen of claim 1, wherein the combination shows a CTF value of 0.40 or more at spatial frequency of 2 lines/mm when it is employed in combination with a double-sided radiographic film showing a cross-over of 14%.

5. A system for producing a radiographic image which comprises a couple of radiographic intensifying screens and a double-sided radiographic film intervening between the intensifying screens, wherein a radiographic intensifying screen arranged on the side near to an object to be exposed to radiation is the radiographic intensifying screen of claim 1.

6. The radiographic intensifying screen of claim 1, wherein the surface protective layer has a thickness of 3 to 20 μm.

7. The radiographic intensifying screen of claim 1, wherein the titanium dioxide particles are of rutile structure and have a mean particle size of 0.2 to 0.3 μm.

8. The radiographic intensifying screen of claim 1, wherein the volume content of the light-reflecting titanium dioxide is from 40–75%.

9. The radiographic intensifying screen of claim 1, wherein the volume content of the light-reflecting titanium dioxide is 47%.

10. The radiographic intensifying screen of claim 1, wherein the phosphor is selected from the group consisting of $Y_2O_2S:Tb$, $Gd_2O_2S:Tb$, $La_2O_2S:Tb$, $(Y,Gd)_2O_2S:Tb$, and $(Y,Gd)_2O_2S: Tb,Tm$.

11. The radiographic intensifying screen of claim 1, wherein the weight ratio of binder to phosphor is 1:8 to 1:40.

12. The radiographic intensifying screen of claim 1, wherein the phosphor layer has a thickness of 70 to 110 μm.

* * * * *